Patented Apr. 18, 1950

2,504,920

UNITED STATES PATENT OFFICE 2,504,920

AQUEOUS WAX EMULSION

Alfred F. Buckman, Jr., and Margaret M. Rendall, Racine, Wis., assignors to S. C. Johnson & Son, Inc., Racine, Wis.

No Drawing. Application March 18, 1947, Serial No. 735,546

4 Claims. (Cl. 260—28.5)

This invention relates to an aqueous wax emulsion. More particularly, it relates to a novel aqueous wax emulsion particularly adapted to be used in a composition for treating asbestos cement building board.

It has long been known to construct building boards from asbestos fiber and Portland cement by combining them under pressure into a homogeneous dense mass. These asbestos cement building boards are made in various forms such as flat sheets for use as side walls, and corrugated for use as roofing and siding.

These boards have a tendency to absorb sufficient moisture when exposed to damp or wet weather for any substantial time and as a result, swell or creep. This is partially overcome by providing sufficient space to allow for such creeping or swelling of the boards when they are laid.

In addition to this precaution, it has now become common practice to treat the asbestos cement boards during manufacture to a coating composed of wax, stearic acid and white pigment to aid as a water repellent in assisting the boards to shed water. The present shingle treating compositions have failed to provide good beading characteristics. Asbestos cement building board manufacturers have long desired a product which would provide better beading characteristics so that the asbestos cement building board when thus treated would have improved water repellency.

Now, in accordance with our invention, we have discovered an improved aqueous wax emulsion particularly adapted to be used in a composition for treating asbestos cement building board which comprises stearic acid, water-insoluble wax, emulsifying agent and polybutene. The polybutene should constitute about 10% to about 35% of the solids content of the emulsion and should have a molecular weight within the range of from about 500 to about 15,000, but preferably from about 700 to about 3,000. Water should be present in the emulsion in an amount by weight exceeding the total solids content.

Now, having indicated in a general way, the nature and purpose of this invention, the following examples will illustrate the invention. It is to be understood, however, that such examples are presented merely as illustrations of the invention and are not to be construed as limiting the same. In the examples, the ingredients are given in parts by weight, unless otherwise indicated.

Example 1

An aqueous wax emulsion was prepared by melting 24.1 parts stearic acid, 2.8 parts yellow carnauba and 10 parts polybutene having a molecular weight of approximately 940 and a viscosity (Saybolt Universal) of 3230 seconds at 210° F. in a suitable vessel by heating to about 190° F. There was then added 3.5 parts of morpholine and 4 parts ammonium hydroxide of 26° Baumé. To minimize the loss of ammonia during addition, a small amount of water was added. The mixture was then stirred and additional water was added until the total water content was 97 parts. The resulting emulsion was a stable emulsion particularly suited for use in a composition for treating asbestos cement building board.

Example 2

An aqueous emulsion for treating asbestos cement building board was prepared by charging 1 part of aqueous wax emulsion, prepared as in Example 1, ¼ part of white titanium oxide pigment and 24 parts of water into a suitable vessel and the mixture stirred. The resulting emulsion was used for treating asbestos cement building board and provided excellent beading qualities. When water was sprayed on the treated surface, it formed into a plurality of beads which readily ran off of the surface without impregnating it.

Example 3

Example 1 was repeated, except that the polybutene had a molecular weight of approximately 1100 and a viscosity of 3000 seconds at 210° F. This emulsion was then used in preparing an aqueous emulsion according to the method of Example 2, and asbestos cement building boards were treated. The resulting treated boards were equivalent to the treated boards of Example 2 in beading characteristics, and in resulting water repellency.

Example 4

Example 1 was repeated, except that the polybutene had a molecular weight of approximately 1500 and a viscosity of 5800 seconds at 210° F. When diluted 20 to 1 with water and a small amount of white titanium oxide pigment added, it provided an excellent water-repellent finish for coating asbestos cement building board.

Example 5

Example 4 was repeated, except that the polybutene had a molecular weight of approximately 3000 and a viscosity of about 17,000 seconds at 210° F., and 7½ parts were used instead of 10 parts. The resulting emulsion provided an excellent water-repellent finish for coating asbestos cement building board.

Example 6

Example 4 was repeated, except that the polybutene had a molecular weight of from 12 to 15,000 and 5 parts were used instead of 10 parts. The resulting emulsion provided an excellent water-repellent finish for coating asbestos cement building board.

Example 7

Example 4 was repeated, except that the polybutene had a molecular weight of aproximately 780 and a viscosity of 942 seconds at 210° F. The resulting emulsion provided an excellent water-repellent finish for coating asbestos cement building board.

Example 8

Example 4 was repeated, except that the polybutene had a molecular weight of approximately 700 and a viscosity of 540 seconds at 210° F., and 14 parts were used instead of 10 parts. The resulting emulsion provided an excellent water-repellent finish for coating asbestos cement building board.

In the above examples, the use of a variety of polybutenes in varying amounts in an aqueous wax emulsion has been shown wherein the emulsifying agent, stearic acid, wax and water have not been varied. However, it is to be understood that the stearic acid, emulsifying agent, wax and water may be varied over a wide range, although in so doing the polybutene should constitute from about 10% to about 35% of the solids content of the emulsion.

Furthermore, while the concentration of the shingle-treating emulsion was varied in Examples 2 and 4, this is in accordance with the practice of individual asbestos cement building board manufacturers. Ordinarily, they will dilute the aqueous wax emulsion with from 20 to 40 parts of water per part of emulsion. The aqueous wax emulsions shown in the examples will remain stable even though diluted with 40 parts of water per part of emulsion. However, in all instances water should be present in an amount by weight exceeding the total solids content.

The polybutenes operable in this invention vary in molecular weight from about 500 to about 15,000, but preferably from about 700 to about 3,000. It has been found that polybutenes having a molecular weight of less than 500 are too soft and tend to provide an oily film. The polybutenes having higher molecular weights than 15,000 provide a film which is too sticky and a surface on the asbestos cement building board which lacks adhesion. The polybutenes having molecular weights from about 700 to about 3,000 are preferred because of ease of handling, availability and cost.

Although carnauba wax was used in the examples, the invention is not so limited as other water-insoluble waxes, resins and mixtures thereof may be used. Care must be taken, however, that the wax is not of dark color, as the resulting finish desired is white.

Various volatile emulsifying agents may be used, in addition to morpholine-ammonium shown in the examples: e.g. monoethyl-amine, monomethyl-amine, 2-amino-2-methyl-1-propanol, 4-amino-2-butanol.

Thus, in accordance with this invention, an aqueous wax emulsion has been prepared which is particularly suitable for use in an aqueous emulsion for treating asbestos cement building board. The resulting finish not only imparts a pleasing white color to the building board, but provides a water-repellent surface with improved beading characteristics.

Other modes of applying the principles of the invention may be employed instead of those explained change being made as regards the method and/or composition herein disclosed, provided the step or steps stated or the compositions described in any of the following claims or the equivalent of such stated step or steps or compositions be employed.

We claim:

1. An aqueous wax emulsion particularly adapted to be used in a composition for treating asbestos cement building board comprising stearic acid, a water-insoluble wax, a volatile emulsifying agent and polybutene, said polybutene constituting from about 10% to about 35% of the solids content of the emulsion, and having a molecular weight within the range of from about 500 to about 15,000, and water being present in said emulsion in an amount by weight exceeding the total solids content.

2. An aqueous wax emulsion particularly adapted to be used in a composition for treating asbestos cement building board comprising stearic acid, carnauba wax, a volatile emulsifying agent and polybutene, said polybutene constituting from about 10% to about 35% of the solids content of the emulsion, and having a molecular weight within the range of from about 500 to about 15,000, and water being present in said emulsion in an amount by weight exceeding the total solids content.

3. An aqueous wax emulsion particularly adapted to be used in a composition for treating asbestos cement building board comprising stearic acid, a water-insoluble wax, a volatile emulsifying agent and polybutene, said polybutene constituting from about 10% to about 35% of the solids content of the emulsion, and having a molecular weight within the range of from about 700 to about 3,000, and water being present in said emulsion in an amount by weight exceeding the total solids content.

4. An aqueous wax emulsion particularly adapted to be used in a composition for treating asbestos cement building board comprising stearic acid, carnauba wax, a volatile emulsifying agent and polybutene, said polybutene constituting from about 10% to about 35% of the solids content of the emulsion, and having a molecular weight within the range of from about 100 to about 3,000, and water being present in said emulsion in an amount by weight exceeding the total solids content.

ALFRED F. BUCKMAN, Jr.
MARGARET M. RENDALL.

REFERENCES CITED

The following references are of record in the file of this patent:

UNITED STATES PATENTS

| Number | Name | Date |
|---|---|---|
| 2,194,958 | Szegvari et al | Mar. 26, 1940 |
| 2,414,740 | Holmes | Jan. 21, 1947 |

FOREIGN PATENTS

| Number | Country | Date |
|---|---|---|
| 557,179 | Great Britain | Nov. 9, 1943 |

OTHER REFERENCES

"Vistanex," Advance Solvents and Chemical Corp., New York, N. Y. (pages 33-35), June 24, 1938.

"Vistanex," Advance Solvents and Chemical Corp., New York, N. Y., June 24, 1938 (page 19).